United States Patent
Waldschmidt et al.

(10) Patent No.: US 9,157,986 B2
(45) Date of Patent: Oct. 13, 2015

(54) RADOME FOR A RADAR SENSOR IN A MOTOR VEHICLE, AND CORRESPONDING RADAR SENSOR

(75) Inventors: Christian Waldschmidt, Renningen (DE); Raphael Hellinger, Pforzheim (DE); Thomas Hansen, Hildesheim (DE); Thomas Binzer, Ingersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 336 days.

(21) Appl. No.: 13/812,276

(22) PCT Filed: Jun. 1, 2011

(86) PCT No.: PCT/EP2011/059115
§ 371 (c)(1),
(2), (4) Date: Apr. 2, 2013

(87) PCT Pub. No.: WO2012/013398
PCT Pub. Date: Feb. 2, 2012

(65) Prior Publication Data
US 2013/0181859 A1  Jul. 18, 2013

(30) Foreign Application Priority Data
Jul. 28, 2010  (DE) .................. 10 2010 038 517

(51) Int. Cl.
*H01Q 1/32* (2006.01)
*G01S 7/03* (2006.01)
*H01Q 1/42* (2006.01)
(Continued)

(52) U.S. Cl.
CPC . *G01S 7/03* (2013.01); *G01S 7/032* (2013.01);
*H01Q 1/3233* (2013.01); *H01Q 1/3283* (2013.01); *H01Q 1/42* (2013.01); *H01Q 1/526* (2013.01); *H01Q 9/0407* (2013.01); *H01Q 21/065* (2013.01); *H01Q 21/08* (2013.01); *G01S 13/931* (2013.01); *G01S 2007/028* (2013.01); *G01S 2013/9325* (2013.01)

(58) Field of Classification Search
CPC ........ H01Q 1/02; H01Q 1/12; H01Q 1/1271; H01Q 1/32; H01Q 1/3283; H01Q 1/42; G01S 7/00; G01S 7/03
USPC ................. 342/1–4, 70–72, 175; 343/872
See application file for complete search history.

(56) References Cited

U.S. PATENT DOCUMENTS 4,312,002 A * 1/1982 Stewart .................... 343/725
5,955,752 A * 9/1999 Fukaya et al. ............. 257/275
(Continued)

FOREIGN PATENT DOCUMENTS

EP 0 884 799 12/1998
EP 1 049 192 11/2000
(Continued)

OTHER PUBLICATIONS

International Search Report, PCT International Application No. PCT/EP2011/059115, dated Aug. 2, 2011.

*Primary Examiner* — Peter Bythrow
(74) *Attorney, Agent, or Firm* — Kenyon & Kenyon LLP

(57) ABSTRACT

A radome for a radar sensor in a motor vehicle. The radome includes a first region, which is permeable to at least one specific type of electromagnetic waves, in particular radar waves, and a second region, which includes a shield, so that the second region is impermeable to the specific type of electromagnetic waves. Also, a radar sensor is described.

13 Claims, 2 Drawing Sheets

(51) Int. Cl.
   *H01Q 1/52* (2006.01)
   *H01Q 9/04* (2006.01)
   *H01Q 21/06* (2006.01)
   *H01Q 21/08* (2006.01)
   *G01S 13/93* (2006.01)
   *G01S 7/02* (2006.01)

(56) References Cited

U.S. PATENT DOCUMENTS

| | | | | |
|---|---|---|---|---|
| 5,969,686 | A * | 10/1999 | Mackenzie | 343/705 |
| 6,243,024 | B1 * | 6/2001 | Yamabuchi et al. | 340/903 |
| 6,337,661 | B1 * | 1/2002 | Kondoh et al. | 343/700 MS |
| 6,489,927 | B2 * | 12/2002 | LeBlanc et al. | 343/713 |
| 6,496,138 | B1 * | 12/2002 | Honma | 342/70 |
| 6,674,412 | B1 * | 1/2004 | Schmidt et al. | 343/872 |
| 6,937,184 | B2 * | 8/2005 | Fujieda et al. | 342/70 |
| 7,126,525 | B2 * | 10/2006 | Suzuki et al. | 342/70 |
| 7,132,976 | B2 * | 11/2006 | Shinoda et al. | 342/70 |
| 7,142,151 | B2 * | 11/2006 | Suzuki et al. | 342/70 |
| 7,227,493 | B2 * | 6/2007 | Oswald et al. | 342/70 |
| 7,408,500 | B2 * | 8/2008 | Shinoda et al. | 342/70 |
| 7,486,222 | B2 * | 2/2009 | Matsuoka | 342/70 |
| 7,538,714 | B2 * | 5/2009 | Nishijima | 342/70 |
| 7,570,198 | B2 * | 8/2009 | Tokoro | 342/70 |
| 8,149,157 | B2 * | 4/2012 | Takeuchi | 342/70 |
| 2001/0026237 | A1 * | 10/2001 | Okai et al. | 342/70 |
| 2004/0227663 | A1 * | 11/2004 | Suzuki et al. | 342/70 |
| 2005/0105075 | A1 * | 5/2005 | Gottwald et al. | 356/4.01 |
| 2005/0128134 | A1 * | 6/2005 | Shinoda et al. | 342/70 |
| 2007/0040735 | A1 * | 2/2007 | Matsuo et al. | 342/175 |
| 2007/0120759 | A1 * | 5/2007 | Hawes | 343/872 |
| 2007/0252775 | A1 * | 11/2007 | Munk et al. | 343/872 |
| 2010/0321230 | A1 * | 12/2010 | Takeuchi | 342/70 |
| 2014/0159942 | A1 * | 6/2014 | Shi et al. | 342/55 |

FOREIGN PATENT DOCUMENTS

| | | |
|---|---|---|
| EP | 1 471 598 | 10/2004 |
| EP | 2 017 645 | 1/2009 |
| EP | 2 151 888 | 2/2010 |

\* cited by examiner

RADOME FOR A RADAR SENSOR IN A MOTOR VEHICLE, AND CORRESPONDING RADAR SENSOR

FIELD OF THE INVENTION

The present invention relates to a radome for a radar sensor in a motor vehicle and to a corresponding radar sensor.

BACKGROUND INFORMATION

The use of driver assistance systems, especially distance warning or distance-keeping systems in motor vehicles is increasing steadily. In the case of distance-keeping systems on the basis of radar sensors, the corresponding radar sensors are covered by radomes.

A radome for a radar sensor in a motor vehicle is described in European Patent No. EP 2 151 888 A1; here, at least one wall is provided with at least one three-dimensional first structure on a first surface, and a second surface that lies across from the first surface has a second structure, which is adapted to the at least one first structure such that the optical path for electromagnetic waves is generally identical at points of the wall provided with a structure and those without structure.

However, because of the required characteristic of allowing radar beams to pass as freely as possible, such radomes require a lot of space. They must be placed at a distance from each other, so that, for instance, antennas provided for radiating the radar beams, and a corresponding supply network do not interfere with each other.

SUMMARY

In accordance with the present invention, an example radome for a radar sensor in a motor vehicle includes a first region, which is permeable to at least one specific type of electromagnetic waves, especially radar waves, and a second region, which includes a shield, so that the second region is impermeable to the specific type of electromagnetic waves.

In one embodiment, the radar sensor having a radome includes an arrangement for generating electromagnetic waves, which is disposed in the area of the second region of the radome, and/or an arrangement for radiating electromagnetic waves, which is disposed in the area of the first region of the radome.

An example radome for a radar sensor, and a radar sensor having a radome in accordance with the present invention may have the advantage that, over all, a radar sensor having a radome requires considerably less space since the arrangement for generating electromagnetic waves, such as integrated switching circuits etc., and radiating arrangement, i.e., for example, high-frequency antennas etc., are able to be disposed next to each other, for instance on a surface of a circuit board, without negative effects on a radiation of the corresponding electromagnetic waves and without violating any guidelines for electromagnetic compatibility.

According to one further advantageous development of the present invention, the first region and the second region are disposed adjacently, in particular directly next to each other. This has the advantage that the space for a radar sensor including a radome is able to be reduced still further, while the flexibility is increased simultaneously.

According to one further advantageous refinement of the present invention, the shield is provided with cutouts for the feedthrough of circuit tracks. This has the advantage that circuit tracks for antennas for emitting the radar beams, for instance, are able to be situated directly on a circuit board and connectable to a feeder network likewise situated on the circuit board, without this necessitating additional wiring or circuits for the transition of the circuit tracks from the second region to the first region. This enables a simple and cost-effective production of a radar sensor including a radome.

According to one further advantageous development of the present invention, the shield has a separating wall and/or the shield has a thickness which is developed in accordance with a desired suppression of the particular type of electromagnetic waves. This has the advantage of allowing the shield to be optimally adapted to the individually desired type of electromagnetic waves to be suppressed, without at the same time increasing the required space for the radome unnecessarily. The stability of the radome on the whole is able to be increased with the aid of the separating wall.

According to one further advantageous refinement of the present invention, the radome preferably includes the shield's heating arrangement. This has the advantage that ice on the outside of the radome is able to be melted in a simple manner without any need to increase the space requirement of the radome.

According to one further advantageous refinement of the radar sensor of the present invention, the generating arrangement and the radiating arrangement are disposed on a shared side of a surface of a circuit board. This has the advantage that the space required for the radar sensor is able to be reduced further in this way, while the production of the radar sensor is simplified considerably at the same time.

According to one further advantageous further development of the radar sensor, the generating arrangement includes an integrated circuit, especially a monolithic integrated microwave circuit. This has the advantage that a specific type of electromagnetic wave is able to be generated in a simple and cost-effective manner.

According to one further advantageous development of the radar sensor, the radiating arrangement includes high-frequency antennas. This has the advantage that the specific type of electromagnetic waves is able to be radiated in a simple and cost-effective manner.

The radome according to example embodiments of the present invention may in principle be developed in rectangular shape and generally have a base area between generally 50×50 mm to 80×80 mm, preferably between generally 60×60 to 70×70 mm. The same also applies to a base area of a radar sensor. Of course, the two edges may be varied independently of each other. If the first and second regions are situated on a side of a circuit board, they have a mutual ratio between generally 1:1.5 and 1:3, especially generally 1:2. The thickness of the separating wall of the shield for radar beams generally amounts to 0.5-2.5 mm, especially 1-2 mm. Here, radar beams include electromagnetic waves having a frequency of between 20 and 100 GHz, in particular in the range between 23 and 80 GHz, preferably in the range from 24 GHz and/or between 76-81 GHz, in particular between 76 and 77 GHz.

BRIEF DESCRIPTION OF THE DRAWINGS

Exemplary embodiments of the present invention are depicted in the figures and explained in greater detail below.

DETAILED DESCRIPTION OF EXAMPLE EMBODIMENTS

Figure 1:
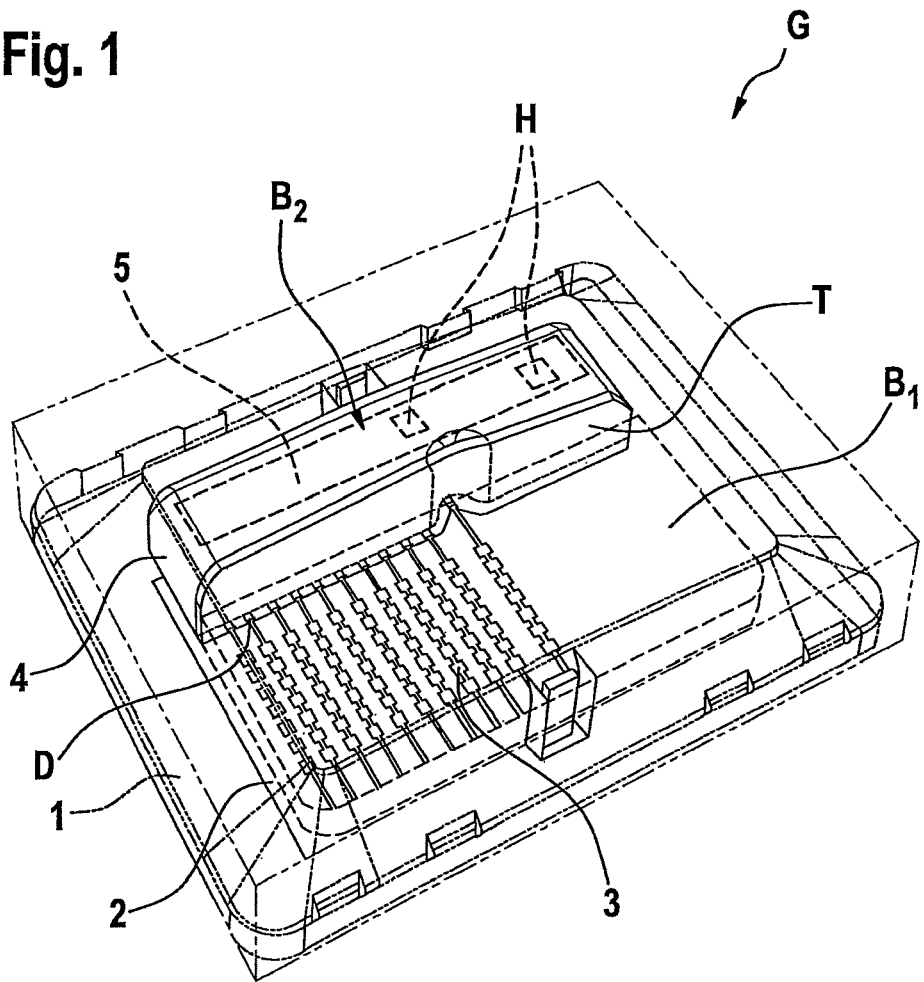
FIG. 1 shows a radar sensor including a radome according to a first specific embodiment of the present invention, in a perspective view.

In the figures, identical or functionally equivalent components are denoted by like reference numerals, provided that nothing is indicated to the contrary.

FIG. 1 shows a radar sensor including a radome according to a first specific embodiment of the present invention, in a perspective view.

In FIG. 1, a radar sensor G having a radome 1 is shown in a perspective view. A planar circuit board 2 is disposed inside radar sensor G. Radome 1 includes two regions $B_1$, $B_2$ and subdivides circuit board 2 on its top surface into two regions $B_1$, $B_2$, which are disposed generally next to each other. First region B1 covers approximately ⅔ of the surface of circuit board 2. Second region B2 covers approximately ⅓ of the surface of circuit board 2. A plurality of circuit tracks implemented as high-frequency antennas 3 extend on circuit board 2, parallel to each other. High-frequency antennas 3 extending in parallel also project into second region $B_2$ of radome 1. Second region $B_2$ is covered by a shield 4 of radome 1, which has cutouts D to thread the circuit tracks of high-frequency antennas 3 from first region $B_1$ to second region $B_2$. To stabilize radome 1, which may be produced by injection molding, for instance, a separating wall T is disposed in the transition region between the two regions $B_1$ and $B_2$. If radome 1 or shield 4 has sufficient stability, separating wall T may also be omitted. Additional integrated switching circuits 5, which generate radar beams, are disposed in region $B_2$ on circuit board 2. They are connected to high-frequency antennas 3 via circuit tracks. When radar sensor G is operating, the radar beams are then radiated by high-frequency antennas 3 located in region $B_1$, but they do not penetrate region $B_2$ due to impermeable shield 4, and are also not emitted there.

Figure 2:
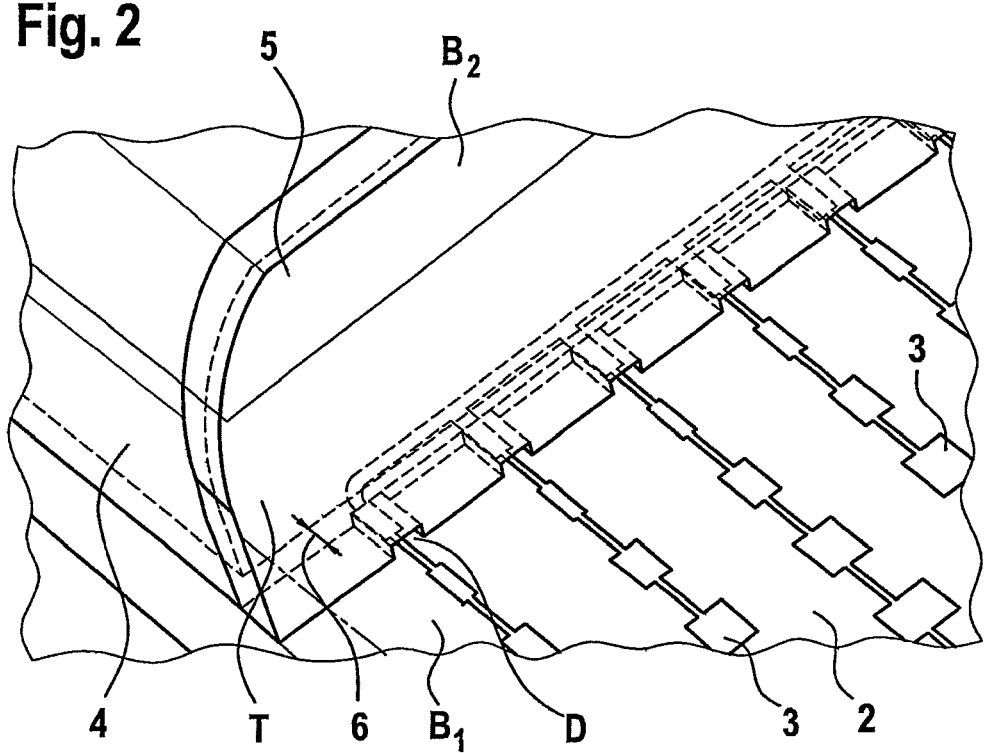
FIG. 2 shows a cut-away portion from FIG. 1 of a radar sensor including a radome according to the first specific embodiment of the present invention.

FIG. 2 shows a cutaway from FIG. 1 of a radar sensor including a radome according to the first specific embodiment of the present invention.

FIG. 2 shows a cutaway portion of FIG. 1 in the transition between first region $B_1$ and second region $B_2$. High-frequency antennas 3 are visible, which extend in parallel with each other on circuit board 2, from first region $B_1$ to second region $B_2$. Shield 4, which has cutouts D, is disposed in region $B_2$, so that shield 4 completely surrounds the circuit tracks of high-frequency antennas 3 in second region $B_2$ and in this way shields integrated switching circuits 5 in second region $B_2$ from the radar beams emitted by high-frequency antennas 3 in region B1. Also plotted is thickness 6 of shield 4. Thickness 6 is measured parallel to the surface of circuit board 2 in the direction of high-frequency antennas 3 extending in parallel, and extends, as does shield 4 over all, perpendicular to the surface of circuit board 2. Thickness 6 is adapted in such a way that the radar radiation emitted by high-frequency antennas 3 is not able to penetrate region $B_2$, or is able to penetrate it only to a negligible degree.

In summary, the present invention may offer the advantages of allowing a cost-effective production and reducing the required space for a radar sensor, without any loss in electromagnetic compatibility.

Although the present invention has been described above with reference to preferred exemplary embodiments, it is not limited thereto but rather is modifiable in many ways.

What is claimed is:

1. A radome for a radar sensor in a motor vehicle, comprising:
   a first region which is configured to accommodate an arrangement to radiate electromagnetic waves and permeable to at least one specific type of electromagnetic waves; and
   a second region which is configured to accommodate an arrangement to generate electromagnetic waves and includes a shield so that the second region is impermeable to the specific type of electromagnetic waves, the shield having a separating wall with a plurality of cutouts for feedthrough of circuit tracks from the arrangement to generate electromagnetic waves to the arrangement to radiate electromagnetic waves.

2. The radome as recited in claim 1, wherein the electromagnetic waves include radar waves.

3. The radome as recited in claim 1, wherein the first region and the second region are situated directly next to each other.

4. The radome as recited in claim 1, wherein the shield has a thickness according to a desired suppression of the particular type of electromagnetic waves.

5. The radome as recited in claim 1, wherein the shield includes a heater.

6. A radar sensor in a motor vehicle, comprising:
   a radome, including:
      a first region which is configured to accommodate an arrangement to radiate electromagnetic waves and permeable to at least one specific type of electromagnetic waves; and
      a second region which is configured to accommodate an arrangement to generate electromagnetic waves and includes a shield so that the second region is impermeable to the specific type of electromagnetic waves, the shield having a separating wall with a plurality of cutouts for feedthrough of circuit tracks from the arrangement to generate electromagnetic waves to the arrangement to radiate electromagnetic waves;
   the arrangement to generate electromagnetic waves disposed in an area of the second region of the radome; and
   the arrangement to radiate electromagnetic waves, disposed in an area of the first region of the radome.

7. The radar sensor as recited in claim 6, wherein the generating arrangement and the radiating arrangement are situated on a shared side of a surface of a circuit board.

8. The radar sensor as recited in claim 7, wherein the generating arrangement includes a monolithic integrated microwave circuit.

9. The radar sensor as recited in claim 7, wherein the radiating arrangement includes high-frequency antennas.

10. A method, comprising:
   providing a radome having a first region and a second region for a radar sensor, the first region being configured to accommodate an arrangement for radiating electromagnetic waves and permeable to radar waves, the second region being configured to accommodate an arrangement to generate electromagnetic waves and including a shield so that the second region is impermeable to the radar waves, the shield having a separating wall with a plurality of cutouts for feedthrough of circuit tracks from the arrangement to generate electromagnetic waves to the arrangement for radiating electromagnetic waves, and the first region and the second region being situated next to each other on a shared side of a surface of a circuit board; and
   using the radar sensor in a motor vehicle.

11. The method as recited in claim 10, wherein the shield substantially encompasses the arrangement to generate electromagnetic waves.

12. The radome as recited in claim 1, wherein the shield substantially encompasses the arrangement to generate electromagnetic waves.

13. The radar sensor as recited in claim 6, wherein the shield substantially encompasses the arrangement to generate electromagnetic waves.

* * * * *